United States Patent
Yuzawa et al.

(10) Patent No.: US 7,113,884 B1
(45) Date of Patent: Sep. 26, 2006

(54) POSITIONING APPARATUS FOR AN ELECTRICAL DISCHARGE MACHINE AND A METHOD THEREFOR

(75) Inventors: Takashi Yuzawa, Tokyo (JP); Masahiro Yamamoto, Tokyo (JP)

(73) Assignees: Mitsubishi Denki Kabushiki Kaisha, Tokyo (JP); Mitsubishi Electric Engineering Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,350

(22) PCT Filed: May 8, 1998

(86) PCT No.: PCT/JP98/02055

§ 371 (c)(1),
(2), (4) Date: Jan. 7, 2000

(87) PCT Pub. No.: WO99/58277

PCT Pub. Date: Nov. 18, 1999

(51) Int. Cl.
*B23H 7/26* (2006.01)

(52) U.S. Cl. ............... 702/150; 702/152; 702/166; 219/69.16

(58) Field of Classification Search ........ 702/150–172, 702/64, 65, 95; 219/68, 69.1, 69.12, 69.13, 219/69.14, 69.15, 69.16–69.19, 69.2
See application file for complete search history.

(56) References Cited

U.S. PATENT DOCUMENTS

| | | | | |
|---|---|---|---|---|
| 3,614,372 A | * | 10/1971 | Dulebohn | 219/69 |
| 3,825,714 A | * | 7/1974 | Marendaz | 219/69.16 |
| 3,875,362 A | * | 4/1975 | Balleys | 219/69.17 |
| 3,875,374 A | * | 4/1975 | Inoue | 219/69.16 |
| 3,988,560 A | * | 10/1976 | Losey et al. | 219/69.13 |
| 4,004,123 A | * | 1/1977 | Inoue | 219/69 |
| 4,005,303 A | * | 1/1977 | Inoue | 219/69.13 |
| 4,039,779 A | * | 8/1977 | Rupert | 219/69 |
| 4,321,451 A | * | 3/1982 | Inoue | 219/69 |
| 4,338,504 A | * | 7/1982 | Gray | 219/69 |
| 4,510,365 A | * | 4/1985 | MacGregor et al. | 219/69.16 |
| 4,527,034 A | * | 7/1985 | Inoue et al. | 219/69.16 |
| 4,700,039 A | * | 10/1987 | Konno et al. | 219/69.16 |
| 4,703,144 A | * | 10/1987 | Goto et al. | 219/69.18 |
| 5,023,421 A | * | 6/1991 | Bouchoud | 219/69.13 |
| 5,089,681 A | * | 2/1992 | El-Menshawy | 219/69.16 |
| 5,171,956 A | * | 12/1992 | Haruki et al. | 219/69.13 |
| 5,231,257 A | * | 7/1993 | Sasaki | 219/69.13 |
| 5,315,088 A | * | 5/1994 | Yamada et al. | 219/69.12 |
| 5,336,863 A | * | 8/1994 | Terui | 219/69.14 |
| 5,393,947 A | * | 2/1995 | Liang et al. | 219/69.18 |
| 5,428,201 A | * | 6/1995 | Kaneko et al. | 219/69.16 |
| 5,496,984 A | * | 3/1996 | Goto et al. | 219/69.18 |
| 5,744,775 A | * | 4/1998 | Yasuda et al. | 219/69.12 |
| 5,756,955 A | * | 5/1998 | Goto et al. | 219/69.13 |

FOREIGN PATENT DOCUMENTS

| | | |
|---|---|---|
| EP | A 0 672 494 | 9/1995 |
| JP | 56-139836 | 10/1981 |

(Continued)

*Primary Examiner*—Marc S. Hoff
*Assistant Examiner*—Jeffrey R West
(74) *Attorney, Agent, or Firm*—Sughrue Mion, PLLC (57) ABSTRACT

A positioning apparatus for an electrical discharge machine includes: a power supply 106 for applying a pulse voltage between an electrode 101 and a workpiece 102; a discharge detecting means 1108 for detecting the occurrence of electrical discharge between the electrode 101 and the workpiece 102; and a means for generating a positioning completion signal on the basis of a detection signal from the discharge detecting means 1108.

7 Claims, 8 Drawing Sheets

FOREIGN PATENT DOCUMENTS

| | | | |
|---|---|---|---|
| JP | 57021227 A | * | 2/1982 |
| JP | 57021227 A | * | 2/1982 |
| JP | 61-121833 | | 6/1986 |
| JP | 61121833 A | * | 6/1986 |
| JP | 5-277833 | | 10/1993 |
| JP | 05345229 A | * | 12/1993 |
| JP | 05345229 A | * | 12/1993 |
| JP | 6-71517 | | 3/1994 |
| JP | 8-267323 | | 10/1996 |

* cited by examiner

POSITIONING APPARATUS FOR AN ELECTRICAL DISCHARGE MACHINE AND A METHOD THEREFOR

TECHNICAL FIELD

The present invention relates to improvements on a position detecting apparatus for detecting a gap between an electrode and a workpiece in an electrical discharge machine, as well as a method therefor, wherein the detection of the gap is effected by using the electrical discharge which takes place between the electrode and the workpiece, by relatively moving the electrode and the workpiece.

BACKGROUND ART

In an electrical discharge machine for machining a workpiece by electrical discharge occurring in a gap between an electrode and a workpiece (hereafter referred to as the electrode gap, as necessary) while changing the relative position of the electrode and the workpiece, it has been the practice to set a reference value for accurately ascertaining the aforementioned relative position so as to obtain high geometric accuracy. Conventionally, to set such a reference value, a positioning apparatus is known in which the electrode and the workpiece are brought into direct contact with each other, and this position of contact is set as the reference.

Figure 10:
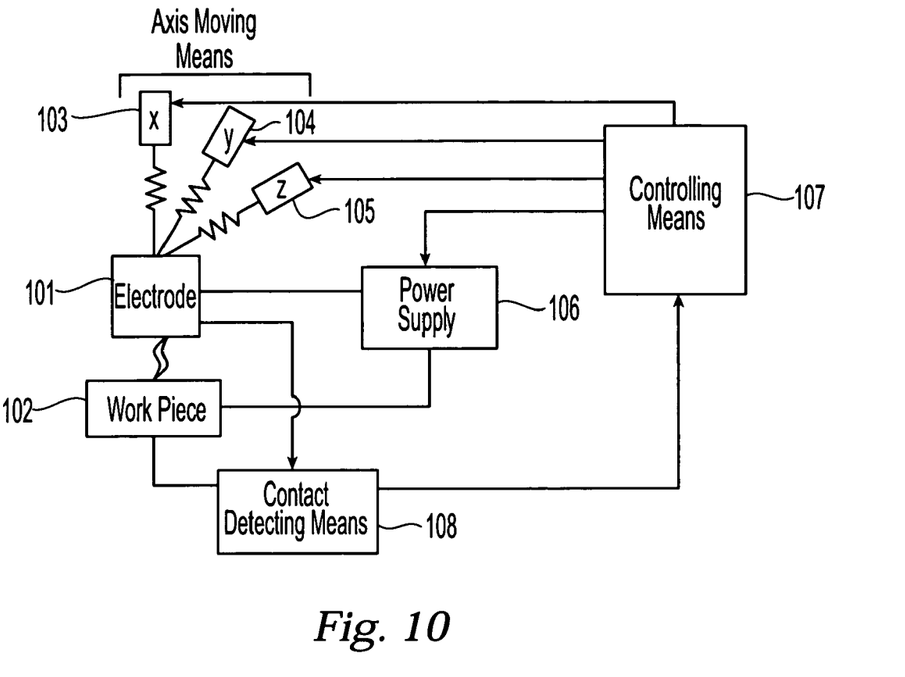
FIG. 10 is a block diagram illustrating an overall configuration of a conventional electrical discharge machine.

Referring to FIG. 10, a description will be given of this positioning apparatus. FIG. 10 is a block diagram illustrating a conventional electrical discharge machine in its entirety. In FIG. 10, the electrical discharge machine has as its main components an electrode 101 for machining; an X-axis moving means 103, a Y-axis moving means 104, and a Z-axis moving means 105 for relatively moving a workpiece 102 with respect to the electrode 101; a power supply 106 for machining for applying a voltage pulse between the electrode 101 and the workpiece 102; an NC control means 107 for imparting instructions on the position to the X-axis moving means 103, the Y-axis moving means 104, and the Z-axis moving means 105; and a contact detecting means 108 serving as a positioning apparatus for detecting the state of contact between the electrode 101 and the workpiece 102.

Referring to FIG. 10, a description will be given of the positioning of the electrical discharge machine arranged as described above. First, in the setup work prior to machining, the X-axis moving means 103, the Y-axis moving means 104, and the Z-axis moving means 105 are operated in accordance with the instructions on the position from the NC control means 107, and the fact that the electrode 101 has contacted the workpiece 102 is detected by the contact detecting means 108 so as to set a reference value. Since the coordinates of the relative position of the electrode 101 and the workpiece 102 can be detected, high-accuracy machining is possible.

However, in a case where a contact portion of the electrode 101 is very small, since the electrode 101 and the workpiece 102 are brought into contact with each other, there has been a first problem in that the tip of the electrode 101 can be broken by the impact.

In addition, to effect very fine machining, it has been the practice to subject a rod electrode having a diameter of several tens of microns or thereabouts as the electrode 101 to dressing forming by means of reverse discharge by using a block electrode and a wire electrode, and to effect fine machining by means of the formed electrode 101, but there has been a problem similar to the aforementioned first problem.

Figure 11:
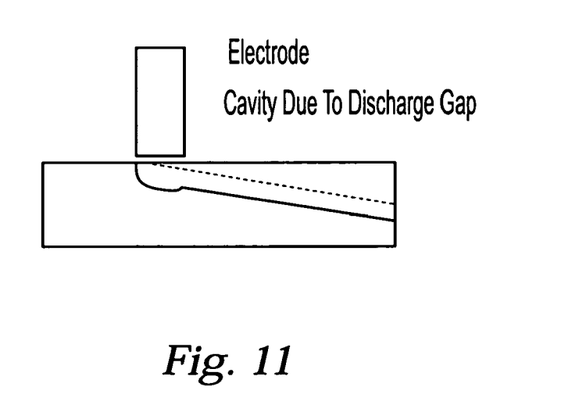
FIG. 11 is a side elevational view of the electrode and the workpiece positioned by using the positioning apparatus shown in FIG. 10.

In addition, the actual depth after machining subsequent to the positioning is one in which the amount of discharge gap is added to the amount of feeding of the haft during machining, as shown in FIG. 11. Accordingly, the amount of feeding is a value in which the amount of discharge gap is subtracted from the depth after machining. However, since data on the amount of discharge gap must be acquired in advance for each electrical condition, and the value varies due to the working-fluid jetting pressure for the electrode gap, the electrode-gap sludge, and the like, there has been a second problem in that the above-described conventional electrical discharge machine is unsuitable for high-accuracy machining.

DISCLOSURE OF THE INVENTION

The present invention has been devised to overcome the above-described problems, and its object is to provide a simple positioning apparatus for an electrical discharge machine between an electrode and a workpiece, as well as a method therefor.

To attain this object, a positioning apparatus for an electrical discharge machine in accordance with a first aspect is characterized by comprising: a power supply for applying a pulse voltage between an electrode and a workpiece; a discharge detecting means for detecting the occurrence of electrical discharge between the electrode and the workpiece; and a means for generating a positioning completion signal on the basis of a detection signal from the discharge detecting means.

A positioning apparatus for an electrical discharge machine in accordance with a second aspect is characterized by comprising: a power supply for applying a pulse voltage between an electrode and a workpiece; a discharge detecting means for detecting the occurrence of electrical discharge between the electrode and the workpiece; a counting means for counting a detection signal from the discharge detecting means a predetermined number of times and for generating a counting completion signal; and a means for generating a positioning completion signal on the basis of the completion signal from the counting means.

A positioning apparatus for an electrical discharge machine in accordance with a third aspect is characterized by further comprising: a stopping means for stopping pulses of the power supply on the basis of the detection of the positioning completion signal and for generating a signal for stopping the movement of the electrode.

A positioning apparatus for an electrical discharge machine in accordance with a fourth aspect includes a power supply for applying a pulse voltage between an electrode and a workpiece and a mean-voltage obtaining means for obtaining a mean voltage between the electrode and the workpiece, so as to control a gap between the electrode and the workpiece on the basis of a mean voltage value of the mean-voltage obtaining means, and is characterized by comprising: a discharge detecting means for detecting the occurrence of electrical discharge between the electrode and the workpiece; a counting means for counting a detection signal from the discharge detecting means a predetermined number of times and for generating a counting completion signal; and a short-circuiting means for short-circuiting the electrode and the workpiece at an arbitrary voltage on the basis of the completion signal from the counting means.

The positioning apparatus for an electrical discharge machine in accordance with a fifth aspect further comprises: a comparing means for comparing the mean voltage value of the mean-voltage obtaining means and a reference voltage value on the basis of relative movement of the electrode with respect to the workpiece; and a stopping means for generating a stop signal for stopping the movement of the electrode and for stopping the output of the power supply if it is determined by the comparing means that the mean voltage value is equal to or less than the reference voltage value.

A method of positioning an electrical discharge machine in accordance with a sixth aspect is characterized by comprising the steps of: applying a pulse voltage between an electrode and a workpiece; detecting the occurrence of electrical discharge between the electrode and the workpiece by a discharge detecting means; and generating a positioning completion signal on the basis of a detection signal from the discharge detecting means.

A method of positioning an electrical discharge machine in accordance with a seventh aspect is characterized by comprising the steps of: applying a pulse voltage between an electrode and a workpiece by a power supply; detecting the occurrence of electrical discharge between the electrode and the workpiece by a discharge detecting means; counting a detection signal from the discharge detecting means a predetermined number of times set by a counting means and for generating a counting completion signal; and generating a positioning completion signal on the basis of the completion signal from the counting means.

A method of positioning an electrical discharge machine in accordance with an eighth aspect, wherein a pulse voltage is applied between an electrode and a workpiece by a power supply, and a mean voltage between the electrode and the workpiece is obtained by a mean-voltage obtaining means, so as to control a gap between the electrode and the workpiece on the basis of a mean voltage value of the mean-voltage obtaining means, is characterized by comprising the steps of: detecting the occurrence of electrical discharge between the electrode and the workpiece by a discharge detecting means; counting a detection signal from the discharge detecting means a predetermined number of times by a counting means and generating a counting completion signal; and short-circuiting the electrode and the workpiece at an arbitrary voltage by a short-circuiting means on the basis of the completion signal from the counting means.

BRIEF DESCRIPTION OF THE DRAWINGS

FIG. 7(a) to FIG. 7(e) are side elevational views illustrating the procedure for machining the workpiece as shown in FIG. 6;

BEST MODE FOR CARRYING OUT THE INVENTION

Next, a description will be given hereinunder of the embodiments of the present invention.

First Embodiment

Figure 1:
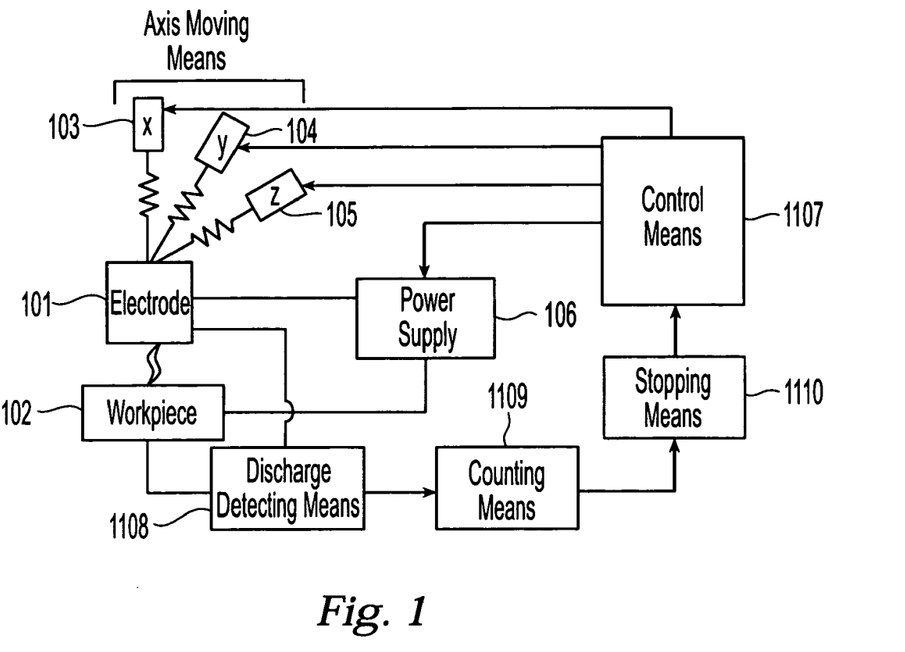
FIG. 1 is a block diagram illustrating an electrical discharge machine in its entirety in accordance with an embodiment of the present invention.
Figure 2:
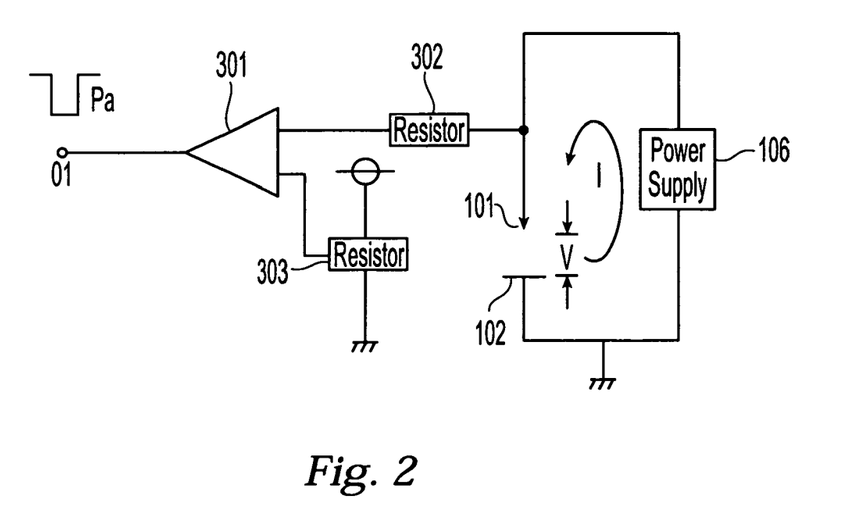
FIG. 2 is a schematic diagram illustrating a discharge-pulse detecting circuit shown in FIG. 1.
Figure 3:
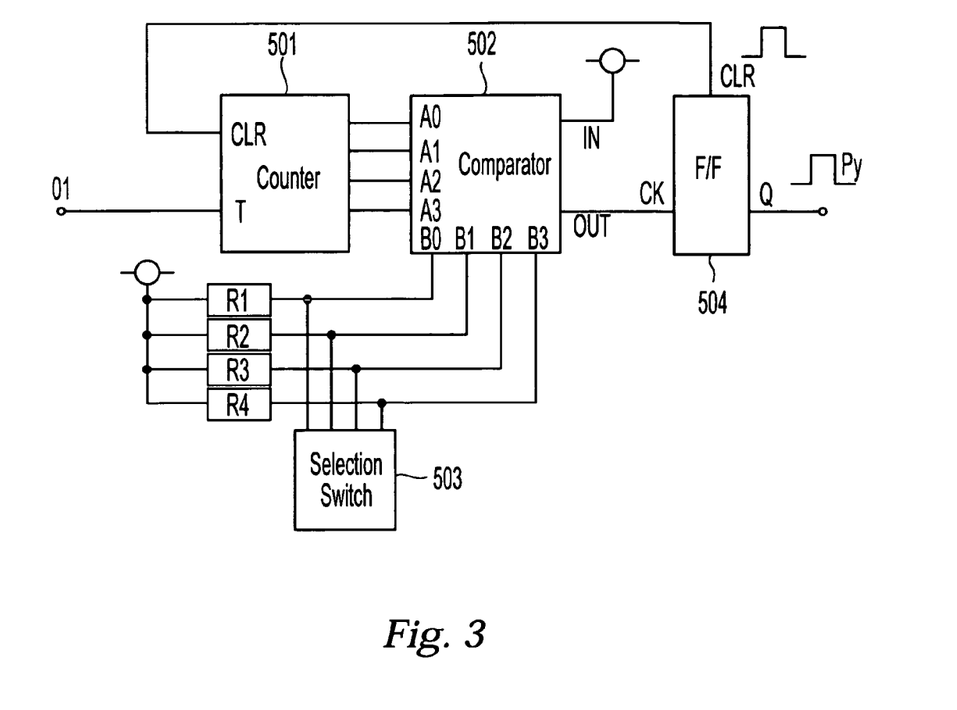
FIG. 3 is a schematic diagram illustrating a counting means shown in FIG. 1.

Referring to FIGS. 1 to 3, a description will be given of an embodiment of the present invention. FIG. 1 is a block diagram illustrating an electrical discharge machine in its entirety; FIG. 2 is a schematic diagram illustrating a discharge detecting means shown in FIG. 1; and FIG. 3 is a schematic diagram illustrating a counting means shown in FIG. 1. In the drawings, those reference numerals that are identical to those of the conventional apparatus denote identical or corresponding parts, and a description thereof will be omitted.

In FIGS. 1 to 3, the positioning apparatus for the electrical discharge machine is comprised of a controlling means 1107 for imparting instructions on the position to an X-axis moving means 103, a Y-axis moving means 104, and a Z-axis moving means 105 for an electrode 101 and for determining the completion of positioning; a discharge detecting means 1108 for detecting the occurrence of electrical discharge between the electrode 101 and a workpiece 102; a counting means 1109 for counting a pulse detection signal detected by the discharge detecting means 1108 until the number of pulses of the pulse detection signal reaches a preset number of pulses, and for generating a counting completion signal; and a stopping means 1110 for generating a positioning completion signal on the basis of the completion signal from the counting means 1109 and for generating a stop signal for stopping an output of a power supply 106 as well as the X-axis moving means 103, the Y-axis moving means 104, and the Z-axis moving means 105.

The counting means 1109 and the stopping means 1110 are comprised of a counter 501 for counting output pulses of the discharge detecting means 1108 and outputting the number of pulses; a comparator 502 to which the signal from the output of the counter 501 is inputted and which compares the output signal with the preset number of pulses; a selection switch 503 for setting the aforementioned number of pulses of the comparator 502 through resistors R1 to R4; and a flip-flop 504 to which the output signal from the comparator 502 is inputted and which generates a positioning completion signal Py and resets the counter 501.

Figure 4:
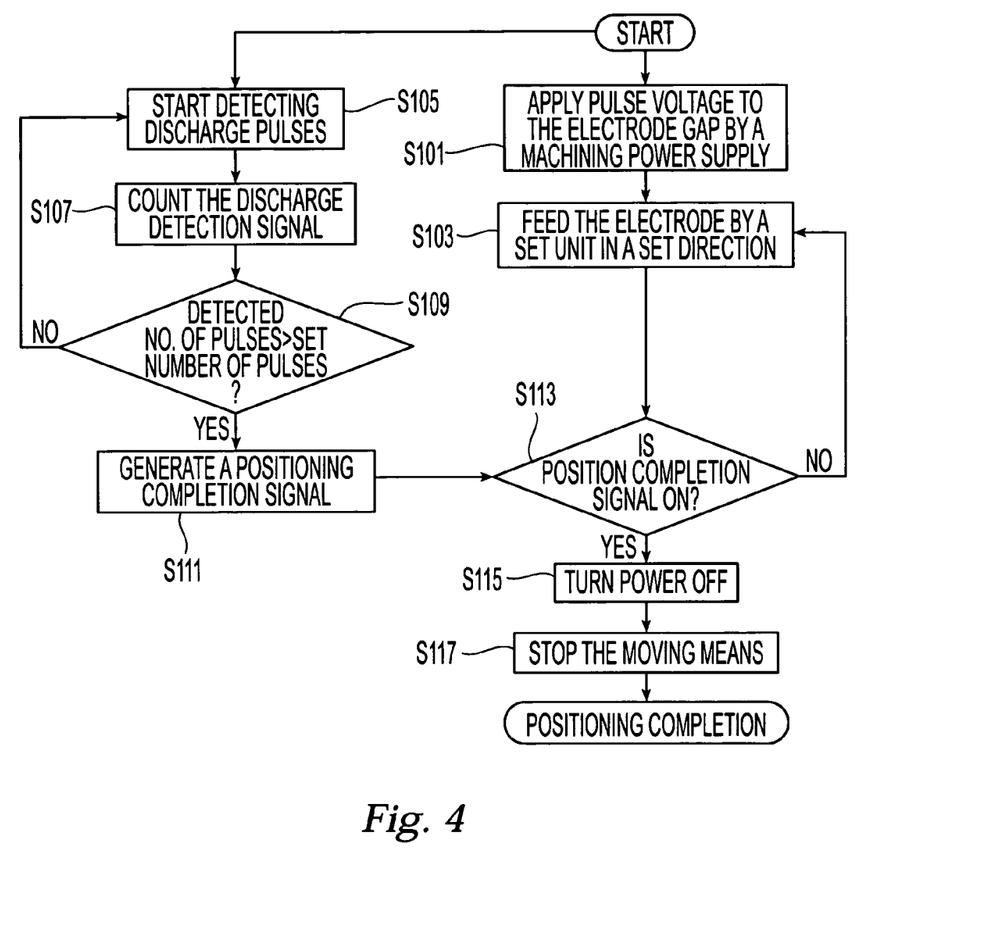
FIG. 4 is a flowchart illustrating the operation in FIG. 1.
Figure 5:
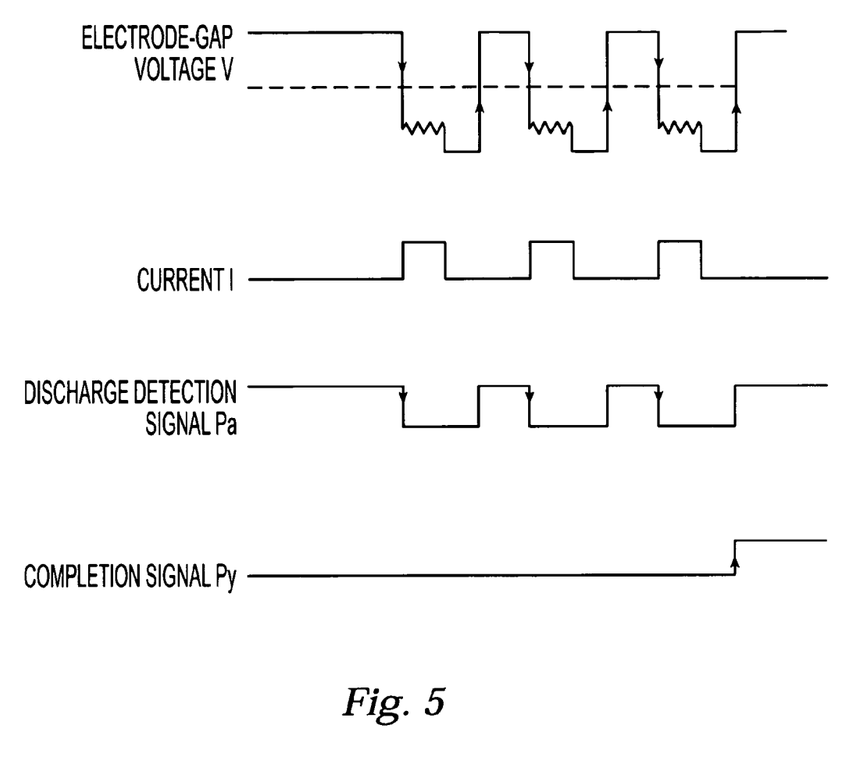
FIG. 5 is a timing chart illustrating the operation in FIG. 1.

Next, a description will be given of the operation of the positioning apparatus arranged as described above with reference to FIGS. 1 to 3, the flowchart in FIG. 4, and the timing chart in FIG. 5. First, a pulse voltage is applied between the electrode 101 and the workpiece 102 from the power supply 106 at the start of positioning (Step S101). The controlling means 1107 operates the X-axis moving means 103, the Y-axis moving means 104, and the Z-axis moving means 105 with respect to the positioning directions, and the electrode 101 is fed in a fixed unit (Step S103). It should be noted that the amount of the electrode fed per unit is generally given in a minimum unit of instruction from an NC controller.

The power supply 106 applies a voltage to the electrode gap, and an electrical discharge soon occurs in the electrode gap. Accordingly, the electrode-gap voltage V drops sharply as shown in FIG. 5, a comparison is made between the reference voltage value of the voltage comparator 301 and the electrode-gap voltage value, the electrode-gap voltage V becomes lower than the reference voltage value, and discharge pulses Pa as a signal for detecting the discharge are generated in the output of the voltage comparator 301 (Step S105).

The counter 501 counts the discharge pulses Pa (Step S107), and the comparator 502 then determines whether or not the counted number of pulses has reached a preset number of pulses "3" (Step S109). If the preset number of pulses has been reached, the flip-flop 504 generates the positioning completion signal Py (Step S111). On the other hand, if the preset number of pulses has not been reached, the operation returns to Step S105.

Here, during a fixed unit of feeding or after a unit of movement, the stopping means 1110 determines whether or not the completion signal Py has been generated (Step S113), and if the completion signal has been generated, the output from the power supply 106 is turned off to stop the discharge in the electrode gap (Step S115), and the operation of the X-axis moving means 103, the Y-axis moving means 104, and the Z-axis moving means 105 is stopped by the stop signal (Step S117), thereby completing the positioning. Meanwhile, if the completion signal has not been output in Step S113, the operation returns to (Step S103).

Since the aforementioned determination on the positioning completion is completed by the detection of the plurality of discharge pulse signals Pa, it is possible to suppress the variation in positioning. In addition, since the electrical discharge occurs with a fixed distance kept in the electrode gap unlike the conventional positioning based on contact, positioning can be effected on a noncontact basis. It should be noted that the distance in the electrode gap after completion of the positioning is determined by the discharge gap, so that the distance in the electrode gap after completion of the positioning can be set arbitrarily in accordance with the electrical conditions such as discharge pulses applied to the electrode gap.

Figure 6A:
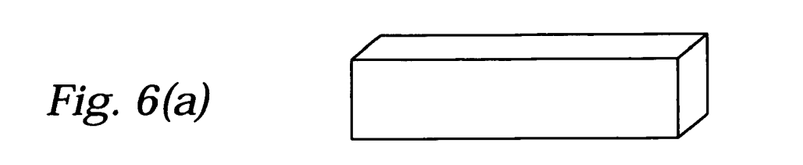
FIG. 6(a) and FIG. 6(b) are perspective views illustrating the machining of a workpiece by using a simple electrode.
Figure 6B:
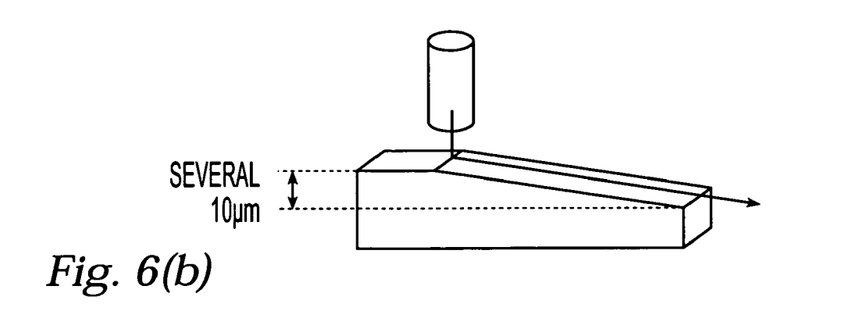
Figure 7A:
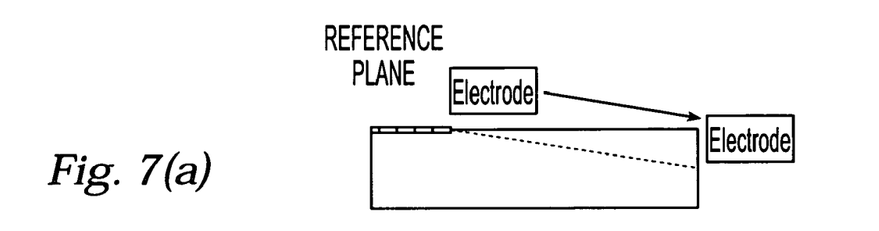
Figure 7B:
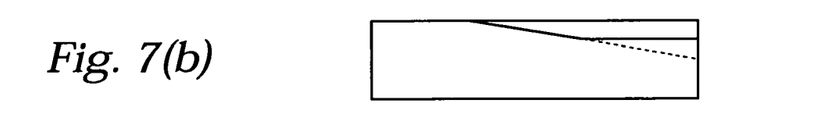
Figure 7C:
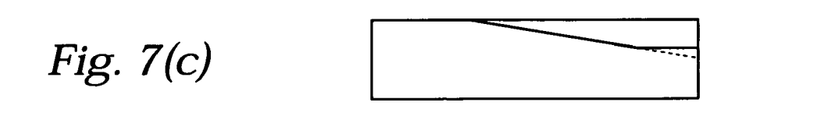
Figure 7D:
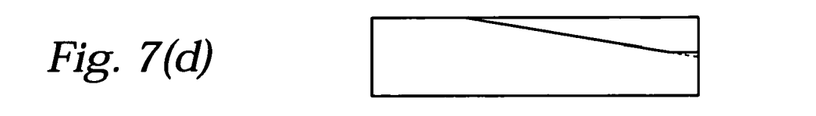
Figure 7E:
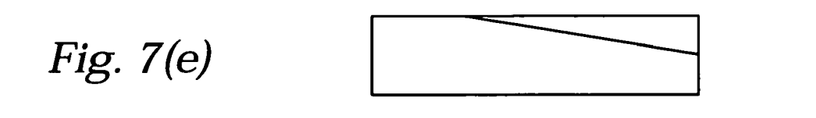

Referring next to FIG. 7, a description will be given of a case in which an island shape, shown in the part (a) of FIG. 6, is machined in an inclined manner as shown in the part (b) of FIG. 6 by a simple electrode by using the above-described positioning apparatus. As shown in the part (a) of FIG. 7, after the positioning of the electrode 101 with respect to a reference plane is effected as described above, the electrode 101 moves along a locus based on the shape of the inclined surface indicated by the dotted line. However, as for the electrode 101 during its movement, electrical discharge ceases midway due to the wear of the electrode, and its formed shape becomes such as the one shown in the part (b) of FIG. 7. Accordingly, positioning is effected again with respect to the reference plane, the amount of wear of the electrode 101 is corrected, and by repeating the machining along the locus in the same manner as described above, a targeted shape can be obtained gradually (the parts (b) to (e) in FIG. 7).

Second Embodiment

A mean value of the electrode-gap voltage obtained by the voltage waveform in the electrode gap is conventionally used as another quantity of state which can be regarded as equivalent to the electrode-gap distance. This is what is called a mean-voltage servo system, and it is conceivable to terminate the positioning when the mean voltage has become a predetermined value or less after the occurrence of electrical discharge in the electrode gap. In this detection, however, since the completion signal is generated after the occurrence of a multiplicity of discharges, the positioning is effected after machining the workpiece, so that it is not appropriate. Accordingly, another embodiment of the present invention is aimed at overcoming the above-described problem by using the mean-voltage servo system.

Figure 8:
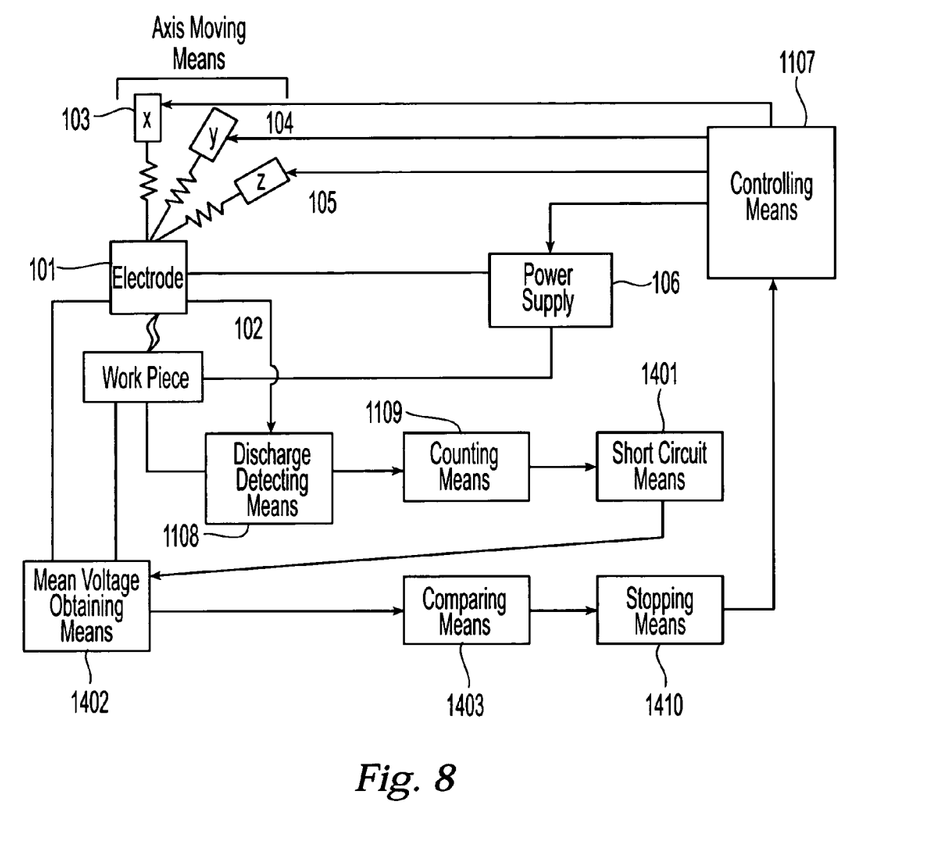
FIG. 8 is a block diagram illustrating the electrical discharge machine in its entirety in accordance with another embodiment of the present invention.

Referring to FIG. 8, a description will be given of the other embodiment of the present invention. FIG. 8 is a block diagram illustrating an electrical discharge machine in its entirety. In the drawing, those reference numerals that are identical to those of FIG. 1 denote identical or corresponding parts, and a description thereof will be omitted. In FIG. 8, the positioning apparatus is comprised of a short-circuiting means 1401 for short-circuiting the electrode gap at an arbitrary voltage by the completion signal of the counting means 1109; a mean-voltage obtaining means 1402 for obtaining a mean voltage in the electrode gap; a comparing means 1403 for comparing the mean voltage value of the mean-voltage obtaining means 1402 with the reference voltage value; and a stopping means 1410 for generating a stop signal for stopping an output of the power supply 106 and as well as the X-axis moving means 103, the Y-axis moving means 104, and the Z-axis moving means 105 if the mean voltage value is lower than the reference voltage value.

Figure 9:
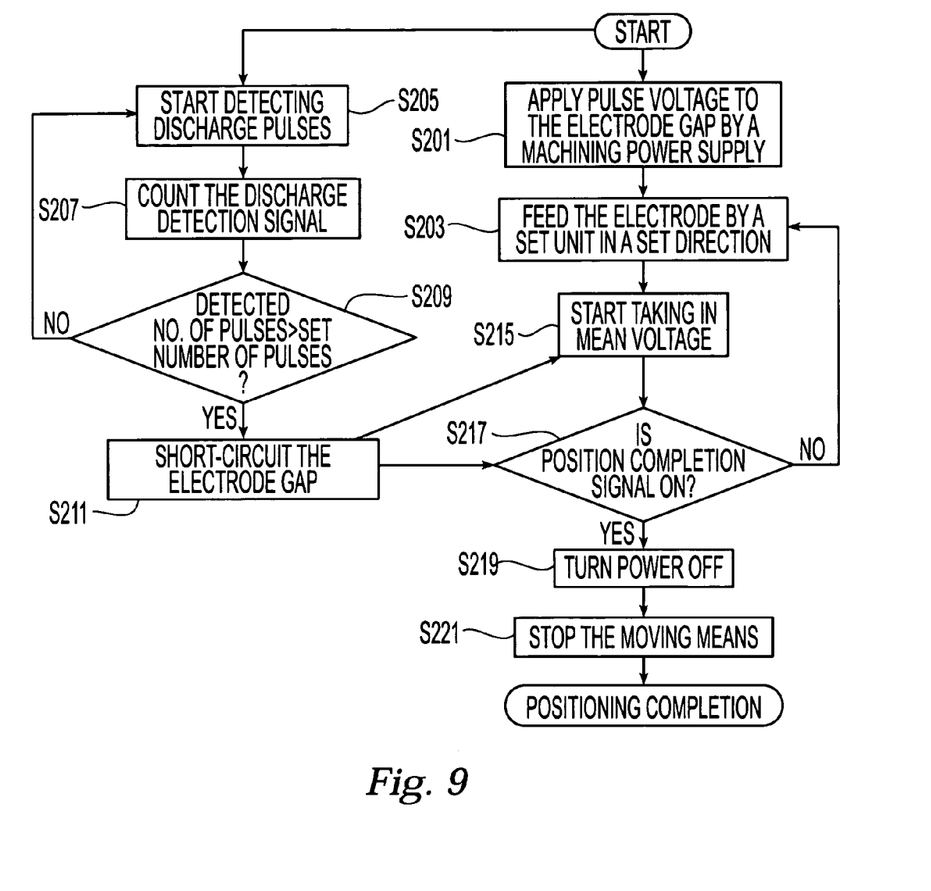
FIG. 9 is a flowchart illustrating the operation in FIG. 8.

Referring to FIG. 8 and the flowchart shown in FIG. 9, a description will be given of the operation of the positioning apparatus arranged as described above. First, a pulse voltage is applied between the electrode 101 and the workpiece 102 from the power supply 106 at the start of positioning (Step S201). The controlling means 1107 operates the X-axis moving means 103, the Y-axis moving means 104, and the Z-axis moving means 105 with respect to the positioning directions, and the electrode 101 is fed in a fixed unit (Step S203). It should be noted that the amount of the electrode fed per unit is generally given in a minimum unit of instruction from an NC controller.

The power supply 106 applies a voltage to the electrode gap, and an electrical discharge soon occurs in the electrode gap. Accordingly, the electrode-gap voltage V drops sharply as shown in FIG. 5, a comparison is made between the reference voltage value of the voltage comparator 301 and the electrode-gap voltage value, the electrode-gap voltage V becomes lower than the reference voltage value, and discharge pulses Pa as a signal for detecting the discharge are generated in the output of the voltage comparator 301 (Step S205).

The counter 501 counts the discharge pulses Pa (Step S207), and the comparator 502 then determines whether or not the counted number of pulses has reached a preset number of pulses "3" (Step S209). If the preset number of pulses has been reached, the short-circuiting means 1401 causes the mean-voltage obtaining means 1402 to short-circuit the electrode 101 and the workpiece 102 at an arbitrary voltage (Step S211). On the other hand, if the preset number of pulses has not been reached, the operation returns to Step S205.

Next, during a fixed unit of feeding the mean-voltage obtaining means 1402 fetches a mean voltage value at the electrode gap (Step S215), and the comparing means 1403 determines whether or not the mean voltage value is equal to or less than the reference voltage value (Step S217). If the mean voltage value is equal to or less than the reference voltage value, the output from the power supply 106 is turned off to stop the discharge in the electrode gap (Step S219), and the operation of the X-axis moving means 103, the Y-axis moving means 104, and the Z-axis moving means 105 is stopped by the stop signal (Step S221), thereby completing the positioning. Meanwhile, if the reference value is higher in Step S217, the operation returns to Step S203.

As described above, in accordance with the first or sixth aspect of the invention, since the gap between the electrode and the workpiece can be positioned to an arbitrary distance, and positioning can be effected on a noncontact basis, there are advantages in that the tip of the electrode is unlikely to become broken and that the dressing forming of the electrode is easy.

In accordance with the second or seventh aspect of the invention, in addition to the advantages of the first or sixth aspect of the invention, there is an advantage in that it is possible to suppress the variation in positioning.

In accordance with the third aspect of the invention, in addition to the advantages of the first or second aspect of the invention, there is an advantage in that the gap between the electrode and the workpiece can be set to an arbitrary distance.

In accordance with the fourth or eighth aspect of the invention, there is an advantage in that positioning can be completed forcibly by short-circuiting the electrode and the workpiece.

In accordance with the fifth aspect of the invention, in addition to the advantages of the forth aspect of the invention, there is an advantage in that since machining can be continued for a slight time duration even if the electrode gap is short-circuited, positioning can be generally completed after completion of a fixed unit of electrode feeding.

INDUSTRIAL APPLICABILITY

As described above the positioning apparatus for an electrical discharge machine and its method in accordance with the present invention are suitable for positioning.

The invention claimed is:

1. A positioning apparatus for controlling a gap between an electrode and a workpiece of a die sinking electrical discharge machine without directly contacting the electrode and the workpiece, the positioning apparatus comprising:
   a power supply for applying a pulse voltage between the electrode and the workpiece without machining the workpiece as the electrode approaches the workpiece;
   a discharge detecting means for detecting an occurrence of electrical discharge between the electrode and the workpiece resulting from the pulse voltage applied between the electrode and the workpiece, when the electrode and the workpiece are in a non-contact condition, and generating a pulse detection signal corresponding to a detection of the occurrence of the electrical discharge;
   a counting means for counting the pulse detection signal generated by said discharge detecting means and generating a counting completion signal when the pulse detection signal has been counted a predetermined number of times; and
   a means for generating a positioning completion signal on the basis of the counting completion signal from said counting means so that positioning is completed when the pulse detection signal has been counted said predetermined number of times.

2. The positioning apparatus according to claim 1, further comprising:
   a stopping means for stopping pulses of said power supply on the basis of a detection of the positioning completion signal and for generating a signal for stopping movement of the electrode.

3. A positioning apparatus for a die sinking electrical discharge machine including a power supply for applying a pulse voltage between an electrode and a workpiece, as the electrode is moved toward the workpiece, without machining the workpiece, and a mean-voltage obtaining means for obtaining a mean voltage between the electrode and the workpiece, so as to control a gap between the electrode and the workpiece on the basis of a mean voltage value of said mean-voltage obtaining means and without directly contacting the electrode and the workpiece, the positioning apparatus comprising:
   a discharge detecting means for detecting an occurrence of electrical discharge between the electrode and the workpiece resulting from the pulse voltage applied between the electrode and the workpiece, when the electrode and the workpiece are in a non-contact condition, and generating a pulse detection signal corresponding to a detection of the occurrence of the electrical discharge;
   a counting means for counting the pulse detection signal generated by said discharge detecting means and generating a counting completion signal when the pulse detection signal has been counted a predetermined number of times; and
   a short-circuiting means for short-circuiting the electrode and the workpiece at an arbitrary voltage on the basis of the counting completion signal from said counting means so that positioning is completed when the pulse detection signal has been counted said predetermined number of times.

4. The positioning apparatus for a die sinking electrical discharge machine according to claim 3, further comprising:
   a comparing means for comparing the mean voltage value of said mean-voltage obtaining means and a reference voltage value on the basis of relative movement of the electrode with respect to the workpiece; and
   a stopping means for generating a stop signal for stopping movement of the electrode and for stopping an output of said power supply if it is determined by said comparing means that the mean voltage value is equal to or less than the reference voltage value.

5. A method of positioning a die sinking electrical discharge machine without directly contacting an electrode and a workpiece, the method comprising the steps of:
   applying a pulse voltage between the electrode and the workpiece by a power supply, as the electrode approaches the workpiece, without machining the workpiece;
   detecting an occurrence of electrical discharge between the electrode and the workpiece resulting from the pulse voltage applied between the electrode and the workpiece, when the electrode and the workpiece are in a non-contact condition, and generating a pulse detection signal corresponding to a detection of the occurrence of the electrical discharge;
   counting the pulse detection signal and generating a counting completion signal when the pulse detection signal has been counted a predetermined number of times; and
   generating a positioning completion signal on the basis of the counting completion signal so that positioning is completed when the pulse detection signal has been counted said predetermined number of times.

6. A method of positioning a die sinking electrical discharge machine wherein a pulse voltage is applied between an electrode and a workpiece by a power supply, as the electrode approaches the workpiece, without machining the workpiece, and a mean voltage between the electrode and the workpiece is obtained by a mean-voltage obtaining means, so as to control a gap between the electrode and the workpiece on the basis of a mean voltage value of said mean-voltage obtaining means and without directly contacting the electrode and the workpiece, the method comprising the steps of:

detecting an occurrence of electrical discharge between the electrode and the workpiece resulting from the pulse voltage applied between the electrode and the workpiece, when the electrode and the workpiece are in a non-contact condition, and generating a pulse detection signal corresponding to a detection of the occurrence of the electrical discharge;

counting the pulse detection signal and generating a counting completion signal when the pulse detection signal has been counted a predetermined number of times; and short-circuiting the electrode and the workpiece at an arbitrary voltage on the basis of the counting completion signal so that positioning is completed when the pulse detection signal has been counted said predetermined number of times.

7. The method of positioning a die sinking electrical discharge machine according to claim 6, further comprising the steps of:

comparing the mean voltage value of said mean-voltage obtaining means and a reference voltage value on the basis of relative movement of the electrode with respect to the workpiece by a comparing means; and generating a stop signal for stopping movement of the electrode and for stopping the output of said power supply if it is determined by said comparing means that the mean voltage value is equal to or less than the reference voltage value.

* * * * *